United States Patent [19]

Bar-Ilan et al.

[11] Patent Number: 4,900,712

[45] Date of Patent: Feb. 13, 1990

[54] CATALYTIC WASHCOAT AND METHOD OF PREPARATION OF THE SAME

[75] Inventors: Amiram Bar-Ilan, Newton; Martin E. Morrill, III, Stoughton, both of Mass.

[73] Assignee: Prototech Company, Newton, Mass.

[21] Appl. No.: 251,312

[22] Filed: Sep. 30, 1988

[51] Int. Cl.$^4$ .......................... B01J 21/04; B01J 32/00
[52] U.S. Cl. .................................... 502/304; 502/320; 502/332; 502/333; 502/334; 502/335; 502/336; 502/439; 423/213.5
[58] Field of Search ............... 502/333, 439, 304, 320, 502/332, 334, 335, 336; 423/213.5

[56] References Cited

U.S. PATENT DOCUMENTS 4,738,947 4/1988 Wan et al. ............................ 502/304
4,791,091 12/1988 Bricker et al. ....................... 502/303

FOREIGN PATENT DOCUMENTS 3223500 12/1983 Fed. Rep. of Germany .
51-31691 3/1976 Japan .

OTHER PUBLICATIONS

Ceria-Promoted Three-Way Catalysts for Auto Exhaust Emission Control, by Gwan Kim.
Ind. Eng. Chem. Prod. Res. Dev. 1982, 21, pp. 267-274, note, especially, p. 268, col. 1, under side heading "Monolithic TWC", lines 11-12 , and p. 272, col. 1, Effect of Non-Noble Metal Oxide Additives.

*Primary Examiner*—W. J. Shine

[57] ABSTRACT

The invention is concerned with a method of adsorbing uniformly onto preformed high surface area crystalline alumina one or more catalytically active non-noble (doping) oxide(s) and preferably alumina-stabliizing non-noble doping oxide(s), both from substantially neutral aqueous colloidal solutions thereof, drying and calcining the doped alumina to form an improved washcoating composition for receiving additionally catalytic noble metal particles.

17 Claims, No Drawings

CATALYTIC WASHCOAT AND METHOD OF PREPARATION OF THE SAME

The present invention is concerned with the preparation of so-called catalytic washcoating compositions or washcoats comprising a refractory high surface area alumina, being particularly directed to improved washcoats comprising other selected base metal oxides, (hereinafter sometimes referred to as doping oxides or dopants) functioning as stabilizers, promoters and/or catalysts, said dopants being applied to said alumina by an improved technique, and such novel washcoats being suitable for bonding to known catalytic supports (including ceramic pellets and honeycombs, metallic honeycombs and the like), and for receiving known catalytic noble metal particles applied thereto by known techniques, whereby enhanced durability and/or performance is imparted to such catalyzed supports, for example under the extreme temperature-cycling conditions encountered in automotive exhausts.

The prior patent and technical literature is replete with descriptions of alumina-based catalytically active oxide-doped washcoating compositions bearing, in addition, catalytic noble metal particles, for oxidation of hydrocarbons and/or reduction of nitrogen oxides (NOx) in fume abatement, automotive exhaust control and the like.

Catalytically active doping oxides, including those particularly useful with the present invention, or their hydroxides, are substantially water-insoluble. Therefore, in the prior art, it has been found necessary to impregnate the high surface area alumina with an aqueous solution of water-soluble salts of the oxides, predominantly nitrates (sometimes chlorides or acetates), requiring subsequent (after drying) high temperature decomposition of such salts to the oxides. Here the simultaneous release of NOx (or other contaminants) into the atmosphere needs to be prevented or minimized by expensive pollution control equipment and operation.

A significant number of patents (but by no means all) are cited in the appended list of documents as indicative of the scope of the state-of-the-art. By way of examples, reference is made here to U.S. Pat. Nos. 3,894,965 (1975), 4,003,976 (1977), 4,120,821 (1978), 4,323,542 (1982) 4,407,738 (1983), and 4,006,103 (1977); also to a publication entitled "Ceria-Promoted Three-Way Catalysts for Auto Exhaust Emission Control" by Gwan Kim (Ind. Eng. Chem. Prod. Res. Dev. 1982, 21, 267-274); and to German Patent No. 3,223,500 assigned to Degussa AG (1983).

By way of background, the "738" patent proposes a single step impregnation of alumina pellets with acidic solutions of the noble metals. The "965" patent coats a honeycomb with partially hydrated amphoteric oxides including $La_2O_3$, $Al_2O_3$, $Cr_2O_3$, $Mn_2O_3$, $TiO_2$, $ZrO_2$, $MnO_2$, $SiO_2$, $SnO_2$, $ThO_2$ and $Mn_3O_4$ and then applies an alkaline noble metal solution thereto. In the "976" patent, NOx is reduced on a complex catalyst including components selected from nickel oxide, copper oxide, manganese oxide, cerium oxide, lanthanum oxide, iron oxide, cobalt oxide, yttrium oxide, niobium oxide as well as platinum, rhodium, and palladium catalysts. It should be noted that, for example, alpha-alumina is there impregnated, by immersion, with nitrate solutions of nickel, copper, iron, barium and chromic acid, and subsequently dried and heated to 600° C. and allowed to stand (at that temperature) for three hours in the presence of a stream of air (Col. 9, line 62 to Col. 10, line 6).

Such procedure illustrates one of the principal drawbacks of the prior art: namely, the required impregnation/drying procedure which, beside causing lack of uniformity, introduces deleteriously the need for protection of the environment because of the release of, here, oxides of nitrogen into air during the high temperature decomposition of nitrates.

The "821" patent discloses a boron oxide type dopant for alumina and the noble metal catalyst, whereas the "542" patent focuses on uranium oxide type dopant as well as mentioning others (Ni, Ce). The "103" patent shows impregnation of $Al_2O_3$ with a nickel nitrate solution followed by drying and calcining. In the Kim article, the effect of dopants, primarily ceria, is described.

Here, "cerous nitrate and ammonium metatungstate were the sources of additive oxides" (p. 269, vol. 1, lines 11-12 under "Experimental Section"). The German patent emphasizes ceria and iron oxides (in addition to nickel oxide, zirconia) as dopants which are applied from nitrate solutions and later converted to oxides. Without attempting the enormous task of being complete, we also attach a significant further list of patent numbers of varying degrees of general background information relating to this invention.

It has been recognized that the performance and/or endurance of the noble-metal-on-alumina catalysts is significantly enhanced by appropriate selection of these non-noble metal doping oxide or dopants—the same then sometimes being referred to herein, including the appended claims, as catalytically active doping oxides. The stabilizing of the alumina under high temperature conditions, i.e. its endurance enhancement, is attributed to, preferably titania and zirconia, which appear to slow down the thermal sintering process of, for example, high surface area gamma-alumina to lower surface area alpha-alumina. Other oxide dopants are actually catalytically active, among them iron oxide, chromium oxide, cerium oxide, lanthanum oxide and nickel oxide.

While the use of colloidal noble metal particle solutions have been introduced by the assignee of this application for depositing critical ranges of particle size on high surface area substrates, see, for example, U.S. Pat. No. 4,102,819, the utility of this kind of approach to the non-noble metal oxide washcoating has not heretofore been evident. Underlying the present invention is the discovery that application of a similar colloidal deposit approach to doping oxides on high surface area alumina containing substrates not only has a significant utility and improvement over prior application techniques, but produces the added beneficial results—non-analogous to the noble metal particle application process—of stabilizing the alumina with certain of the adhered colloidal doping oxide particles by apparently slowing thermal sintering of the substrate in high temperature use, as above mentioned, and adding catalytic activity (apart from the later added noble metal catalyst) by the same or another doping oxide, above identified, with uniformity of adherence over the major portion of the alumina particles of the substrate. It is this class of catalytically active doping oxides including the above-named metal oxides (to be uniformly adsorbed by, but in accordance with the invention, preferably not to be reacted with the alumina) to which the present invention is directed. The invention is concerned with substantially water-insoluble, catalytically active metallic doping oxides of base metals capable of forming water-soluble, heat-decomposible salts of "potentially" air-contaminant producing acids. Their role (i.e., the enhancement of catalytic performance and/or endurance) is entirely different from that of other classes of oxides, such as strontium oxide (and magnesium oxide) which it has been proposed to combine with gamma alumina to increase the abrasion resistance of a granular alumina catalyst carrier, as described, for example, in Japanese Patent No. 51-31691 (1976) by Kumio Okamoto et al. Specifically, here gamma alumina is deliberately reacted either with a colloidal strontium oxide solution or a non-colloidal strontium nitrate solution producing a new abrasion resistant compound, said to result from improved particle bonding, the strontium oxide being catalytically inactive.

In U.S. Pat. No. 4,539,311 (1985) mention is made of an aqueous dispersion of hydrated alumina and colloidal ceria (Col. 3, lines 6-7). A metal honeycomb support is coated with the dispersion, dried and fired, resulting in a mixed $Al_2O_3$-$CeO_2$ washcoat containing a predominant amount of $CeO_2$ throughout the entire coating (Col. 3, lines 35-36). Here the colloid serves the function of binding the oxides to the metal honeycomb. The entire washcoat so formed is merely a variation of the conventional washcoat base for the 4% by weight (Col. 3, 1. 37) of "antipoisoning" barium oxide which is applied by the standard barium nitrate solution impregnation/drying/firing technique of the prior art.

Colloidal alumina solutions have also been used for non-catalytic purposes, for example as binders for high surface area crystalline alumina powders to ceramic or metallic substrates.

Colloidal solutions of other oxides have been used to coat low surface area cores with what amounts to washcoat comprising such other oxides which are subject to subsequent "doping." In U.S. Pat. No. 4,477,492 (1984), for example, glass spheres (or other macroparticles) are coated with a variety of oxides by means of colloidal solutions, preferably silica. "When used as a catalyst support . . . a platinum metal salt can be dispersed within the porous structure of the superficial coating . . . to yield an active platinum metal catalyst" (col. 5, lines 10-11, 24, 26-28). Clearly, here, the oxide coating of the low surface area macroparticles constitutes a washcoat which is functionally no different from the alumina washcoats: subsequent doping of these washcoats, as well, with true (rather than colloidal) solutions of selected oxide salts results in the detrimental effects above described.

In general, as pointed out above, a primary drawback of the techniques of the prior art resides with limitation on the product stemming from the non-uniform application of these dopants on the alumina by means of aqueous, dopant salt-containing solutions, involving impregnation, drying and the contaminant-producing high temperature decomposition of the salt to the oxide. Such prior art deposition techniques result in a deleterious lack of uniformity of the dopants. While we do not wish to be held to any particular theory, it is plausible to attribute it to the formation of a wide spectrum of particle sizes non-uniformly distributed in the alumina, as the oxides "precipitate" from the solution during the drying process. The release of noxious elements by the technique of the prior art constitutes a detrimental environmental threat. Underlying the present invention is the discovery that a substantially neutral colloidal solution of a catalytically active oxide dopant causes the colloidal particles to be adsorbed uniformly by the high surface area alumina, thereby guaranteeing the required uniformity, reproducibility and stability for catalyst use as, for example, in automotive exhaust control, and obviating the environmental hazard.

An object of the invention, accordingly, is to provide a new and improved catalytic washcoat and method of preparation thereof that significantly obviate the deleterious effects of non-uniform dopant deposition on the alumina; and does so through the adsorption by the alumina of the selected doping base metal oxides from substantially non-polluting colloidal solutions thereof, without reacting therewith.

Other and further objects will be explained hereinafter and are more particularly pointed out in the appended claims.

The novel technique underlying the invention, in summary, embraces a method of preparing an aqueous substantially neutral colloidal solution of one or more of each desired catalytically active doping oxide, adsorbing the same uniformly onto particles of a high surface area alumina and drying and calcining the doped alumina to form an improved washcoating composition. The term "catalytically active doping oxide", as sometimes used herein, shall mean a catalytic oxide and/or an oxide which enhances the endurance of the catalytic coating, when deposited on, but not reacted with high surface area alumina.

For the purpose of this invention we select a washcoat base comprising a preformed high surface area crystalline alumina, regardless of whether such "preforming" does or does not involve a colloid. This material allows us to locate small amounts (relative to the amount of alumina washcoat) of the uniformly adsorbed catalytically active dopants on the alumina's high surface area for enhanced performance. While we do not wish to be held to any theory, it is plausible that the interaction between the alumina, the dopants and the noble metal catalyst(s) is significantly more effective with the dopants on the washcoat's surface which is exposed to the reacting contaminants in fumes and exhausts, than it would be with the dopant largely buried within the bulk of the alumina.

Whatever the theory, the preformed alumina (in contrast, for example, to hydrated alumina as a precursor) allows us to limit the amount of dopants relative to the bulk alumina, thereby also substantially retaining, rather than unduly diluting the overall composition of the finished noble metal-bearing catalyst coating. In short, in accordance with this invention, the washcoat comprising the preformed high surface area crystalline alumina is the predominant component of the catalytic coating; its surface serves as the recipient of the relatively small amounts of the uniformly adsorbed colloidal catalytically active doping oxide(s), as well as the noble metal catalysts.

We turn now to the practice of the invention which utilizes the above discovery of the new and uniform particle adsorption from appropriate colloidal solutions of the doping oxide, as distinguished from aqueous true solutions of a salt of the doping oxide, and without reaction with the alumina substrate.

We provide generally a colloidal solution and preferably, whenever practicable, a substantially neutral colloidal solution, in which both the particle size and the particle size distribution of such doping oxides remains stable; that is, without significant growth, for long periods of time. While such stable colloidal oxide solutions are old in the art, the novel use of the same herein produces an improved washcoat by contacting the solution with the high surface area alumina, thereby causing the colloidal particles to be adsorbed onto the alumina without significant change of size of these doping oxide particles.

Experimentally, the difference between the colloidal and noncolloidal solutions is easily demonstrated as follows: When a colloidal solution is passed, for example, through a bed of high surface alumina, the concentration of dopant oxides in the effluent is sharply reduced and often brought down to substantially zero. In contrast, prior art true aqueous doping-component solutions, when passed, for example, through an alumina column, have substantially the same concentration of solute entering and leaving the column, the alumina being impregnated with a fraction of the entering solution in its original composition. This difference between the colloidal solution of the present invention and the prior art true solutions has been found to be a key in insuring uniformity of dopants in the colloidal case of the present invention, as distinguished from decided lack of uniformity in the before-discussed true solution case. Moreover, by choosing the substantially neutral dopant oxide colloids, noxious elements such as nitrates or chlorides are almost entirely avoided, thereby substantially eliminating any air pollution hazard. The seriousness of this threat can readily be understood given the substantial quantities of washcoat required potentially for catalysts in automotive and power plant exhausts; up to 15% of the weight of the washcoat compositions is often representing the dopants. Clearly, corresponding amounts, for example, of NOx would undoubtedly necessitate expensive equipment for atmospheric protection.

While stable solutions are obviously preferred, as above stated, the principle of uniform adsorption has also been adapted, in accordance with the present invention, to freshly prepared transient colloidal solutions. Here, for example, an acidic dopant component solution is first carefully neutralized typically to a pH between 3 and 8 under continuous stirring, and is then added promptly to the high surface area alumina; that is, within seconds, or at the most minutes depending on the rate of growth of the transient colloid. In this instance, it is believed that the high surface area alumina particles act as seeds to adsorb the transient colloidal particles, preventing them from growing to the point of separate coalescence and eventual precipitation. In any event, the transient colloid technique, while delicate to control, has been found to result in improved washcoats comparable to the stable colloid technique as well as obviating the before-mentioned environmental hazard, provided that the doped alumina is separated from the solution, as by filtration and washing, prior to drying and calcining.

Alternately, the transient colloid may be formed in the presence of the alumina particles or precursor thereof, thereby adsorbing the colloidal dopant oxide particles. This latter technique is especially suited for short-lived transient colloids.

The alumina-based washcoat serves as the catalyst support for the catalytically active doping oxides and for the catalytic noble metal particles. In general, the alumina constitutes the predominant amount of the washcoat with the doping oxides present (individually or in combination) in amount of less than about 20% by weight of the total washcoat. While sometimes as little as a fraction of one percent of a catalytic oxide is beneficial, often two or more catalytic oxides are adsorbed advantageously by the alumina, the oxides being present in amount exceeding 2% by weight of the total washcoat.

Best mode embodiments for use with alumina substrates that are to be employed in high temperature catalytic converter applications, such as the before-mentioned automotive exhausts or the like, will now be described.

EXAMPLE 1

A typical known colloidal solution, as prepared by ion exchange, is made as follows: 36.6 g of hydrated ferric nitrate salt is dissolved in 75 cc de-ionized water. At that point the pH is between 0 and 0.5, 32 g of a weakly basic (polyamine) ion exchange resin, sold under the trade name Amberlite IRA 69 by Rohm & Haas, in the hydroxide form is added to the solution with stirring. The hydroxyl ions from the resin exchange with the nitrate ions from the ferric nitrate, producing dissolved ferric hydroxynitrate. As the nitric acid continues to be neutralized by the resin, the pH slowly rises up to about 3.1. The solution at this point is a deep blood-red color. Almost all the nitrate is now retained on the resin and the exchanged hydrogen ions have been substantially neutralized to form water. With most of the nitrate removed, the iron oxide colloid formed is presumably protected by the residual hydrogen ion and its counterion (nitrate) present in trace amounts. After the removal of the resin, the colloidal solution is stable for many weeks, provided that it is not destabilized by heating or by the addition of salts.

The stable colloidal solution of iron oxide is now applied as follows: 1000 grams of high surface area alumina (ca. 200 m$^2$/g) is suspended in 1710 ml of water. 290 ml of the colloidal solution containing 35 g/l of Fe$_2$O$_3$ is added slowly, at ambient temperature, over a period of twenty minutes, under vigorous stirring, and the mixing is then continued for an additional two hours, resulting in an alumina slurry having colloidal Fe$_2$O$_3$ particles substantially and uniformly adsorbed on the alumina. The slurry is then dried at about 180° C. The resulting dry powder has an orange color and is converted to a typical washcoating composition of this invention by calcination in air at 550° C. for about three hours. The washcoat contains about 1% of Fe$_2$O$_3$ by weight.

The washcoat is suitable for application to, for example, ceramic honeycombs and for deposition thereon of typical noble catalysts, e.g. Pt, Rh and/or Pd, by well known techniques metal such as are disclosed, for example in U.S. Pat. No. 4,006,103 or by colloidal noble metal particle deposition as in U.S. Pat. No. 4,082,699 of Common Assignee.

EXAMPLE 2

A stable chromia colloidal solution is prepared as follows:

1540 grams of hydrated chromium nitrate [Cr(NO$_3$)$_3$·9H$_2$O] is dissolved in 3300 ml of deionized water. The initial pH is 0.75. 140 grams of weakly basic ion exchange resin (Amberlite IRA 69) is added in bulk to that solution. The hydroxyl ions of the resin exchange with the nitrate producing chromium hydroxynitrate in solution. After half an hour an additional amount of 346 gram resin is added. As the nitric acid concentration continues to be neutralized by the resin, the pH slowly rises up to 3.1. Most of the nitrate is now retained on the resin.

At this point the slurry is filtered and the filtrate is returned into the beaker and mixed with additional amount of 227 grams of resin. After half an hour of stirring, the slurry is filtered again. The filtrate has a pH of 4.2.

The filtrate is returned to the beaker and a third amount of 1465 grams of resin was added. After stirring and filtering, the final pH obtained is 5.4, and the chromium oxide colloidal solution has a concentration of 25 g/l (as $Cr^{+3}$).

The stable aqueous colloid solution of chromium oxide is now applied to the high surface alumina as follows: 1000 grams of high surface area gamma alumina is suspended in 1960 cc of water. While vigorously stirring 40 ml of the solution containing 25 g/l chromium oxide colloid is added slowly for 20 minutes. The mixing is continued for an additional two hours. The $Cr_2O_3$-on-alumina slurry is then dried at 180° C. The resulting dry powder which has a dark blueish tinge is calcined in air at 550° C. for 3 hours. The chromia dopant contributes to catalytic oxidation of hydrocarbons at high temperatures (above 500° C.). Again, the resulting washcoat is applied to the alumina substrate and noble metal as in Example 1.

EXAMPLE 3

A washcoat powder containing 6.5% by weight of $CeO_2$ is made by applying to 1000 g $Al_2O_3$ suspended in 1868 ml water, 132 ml of a stable colloidal solution of ceria, obtained from Rhone-Poulenc (prepared by peptization), containing 200 g/l of ceria, followed by drying and calcining all as described in the preceding examples.

EXAMPLE 4

A washcoat powder containing 2% by weight of zirconia ($ZrO_2$) is made by applying to 1000 g $Al_2O_3$ in 1900 ml water, 100 ml of a stable colloidal solution of zirconia, obtained from Nyacol Corp. of Ashland, Mass., (prepared by hydrolysis of basic zirconium nitrate) containing 200 g/l of $ZrO_2$, all followed by drying and calcining as described in the preceding examples showing the sintering of the alumina under explosive- to high-temperature.

EXAMPLE 5

A washcoat powder is made by adsorbing onto $Al_2O_3$ colloidal nickel oxide particles from a transient colloid thereof as follows.

Slurry 250 g of alumina in 500 ml of water and add thereto, under stirring, 50 ml of a solution containing 7.72 g of $[Ni(NO_3)_2 \cdot 6H_2O]$ or 1.25 g of $Ni^{++}$. During the addition the initial pH of 6.0 drops to 5.7 due to the slight acidity of the nickel nitrate. While continuing vigorous stirring, add slowly concentrated (27%) aqueous ammonia until the pH reaches 7.5, whereby transient colloidal nickel hydroxide-containing particles are formed and are adsorbed by the high surface area alumina. Continue the stirring at that pH for two hours, until substantial completion. After filtering, the doped alumina is dried and calcined as described in the preceding examples.

Note that the filtrate is colorless, and contains less than 1 ppm of nickel (by atomic adsorption), attesting to the above-described adsorption of the colloidal nickel solution.

As a catalytic component of a washcoated, noble metal bearing ceramic catalyst, the NiO dopant enhances significantly the reduction of NOx in, for example, automotive exhausts.

EXAMPLE 6

Enhanced effectiveness of the colloidal-oxide dopants is attained by the use of more than one oxide on the same sample of alumina (200 m²/g when it is doped (in succession) with the techniques and the appropriate amounts of colloidal solutions, as described in Examples 1-4 herein, to yield a mixed colloid-doped washcoat of the following composition:

$CeO_2$: 6.5% by weight
$ZrO_2$: 2.0% by weight
$Fe_2O_3$: 1.0% by weight
$Cr_2O_3$: 0.1% by weight For comparison, a non-colloid oxide doped washcoat of substantially the same composition was prepared impregnating the alumina, in succession with nitrate solutions, followed by drying and calcining. The washcoats were coated onto ceramic honeycombs (400 cells per inch) and received noble metal Pd/Rh catalysts in the ratio of 5:1 respectively by weight in total amount of 25 g/ft³ of the ceramic honeycomb substrate, by the catalyzing procedure described in U.S. Pat. No. 4,006,103.

The activity of the two catalyst samples was compared using a catalytic reactor tube in a muffle furnace equipped with temperature and flow controls. Gas mixtures containing air, CO, $CO_2$, steam and propane were flown through flow controls into the catalytic reactor at a space velocity of 10,000 [l/hour]. The concentration of each component was determined using a gas chromatograph equipped with a molecular sieve column and HWD detector. Percent conversions of CO and propane in the effluent gas mixture were measured as a function of temperature by comparing the concentrations of these species at room temperature. Light-off temperatures defined as that temperature at which 50% conversion occurs are reported below.

In one series of comparative tests of carbon monoxide conversion rates to $CO_2$ were measured (carbon monoxide is usually the most readily oxidizable contaminant in exhausts), first on the "pristine", that is freshly coated catalyst, and second on the "aged" catalyst, that is after subjecting it to a temperature of 800° C. for 8 hours, during which period particle growth is known to occur with loss of performance. In another series of comparative tests, propane conversion rates to $CO_2$ and water were determined, propane being a typical hydrocarbon contaminant which is known to require significantly higher temperatures (than carbon monoxide) for its catalytic oxidation. Pristine and aged light-off temperatures are shown in the following table.

| | Light-off Temperatures | | | |
| | Carbon monoxide | | Propane | |
| Contaminants | Pristine | Aged | Pristine | Aged |
| --- | --- | --- | --- | --- |
| non-colloidal | 158° C. +/−2° C. | 195° C. −5° C. | 305° C. +/−5° C. | 405° C. +/−5° C. |
| colloidal of the invention | 153° C. +/−2° C. | 185° C. | 305° C. +/−5° C. | 315° C. +/−5° C. |

In the case of CO, there is shown some initial pristine advantage of the colloidal dopant, which is doubled after aging. In the case of propane, the pristine samples light off at about the same temperature, but the retention of catalytic activity, upon aging, due to the colloid dopants, amounts to an order of magnitude in light-off temperature differential, a spectacular effect.

It should be noted that in hydrocarbon oxidation in the presence of steam, ceria is the main catalytic promoter element (other than the noble metals).

A "singly doped" washcoat of $Al_2O_3$, that is one doped with colloidal ceria alone, and then coated with noble metals, accounts for a major portion of the spectacular activity retention.

It is generally known that, for instance in the case of a platinum-on-alumina catalyst, the higher the surface area of the alumina, the better the catalytic performance (see, for example, U.S. Pat. No. 4,082,699, Col. 7, l. 12–18 and Col. 15, table 8 of Common Assignee). Thus, any doping oxide capable of "stabilizing" high temperature-aged alumina, that is slowing its surface area loss during sintering, is extending the useful life of the catalyst. This is so regardless of whether the doping oxide(s) is not, (e.g. $TiO_2$ or $ZrO_2$) or is, (e.g. $CeO_2$ or $La_2O_3$) a catalyst in its own right. In yet another comparative test we have doped a sample of alumina with a surface area of 205 $m^2/g$ (by B.E.T. measurement), with two oxides, contributing to the catalytic performance of the noble metals, namely with 5% $CeO_2$ by weight and 2.5% $La_2O_3$ by weight, in accordance with the method of this invention. We have heated this doped sample and a non-doped sample of the same alumina in air at 1100° C. for eight hours. In this drastic procedure the area of the non-doped alumina has shrunk to 10.7 $m^2/g$, whereas that of the doped alumina has come down only to 81.3 $m^2/g$, a spectacular improvement.

Similar beneficial aging is effected by titania and/or zirconia, which oxides, however, are not contributing to the catalytic efficacy of the noble metals.

To combine the improvements not heretofore anticipated, we prefer to select, in accordance with this invention, more than one environmentally-safe metal oxide dopant which stabilize(s) the alumina as well as enhance(s) the catalytic performance of the noble metal containing structure.

If the amount of metal oxide dopants is too high (in excess of about 20% as before stated), the adherence of the dopant-bearing washcoat to the substrate, e.g. ceramic honeycomb, is reduced; and, moreover, the sintering and coalescence of said excessive amounts of dopants at elevated temperatures can reduce their effectiveness.

While the above-named colloidal oxide dopants are preferred for use in exhaust conversion catalysis, other oxides such as copper oxide, manganese oxide, cobalt oxide and rare earth oxides are also useful therein and subject to colloidal oxide adsorption on the alumina.

As stated above, the alumina (being the support for the catalytically active dopants) is the predominant component of washcoat composition, and is preferably between 85% and 98% of the total weight of the dry washcoat composition.

Other variations will occur to those skilled in the art and are to be considered within the scope of this invention.

We claim:

1. The method of preparing a washcoating composition for use as a component of a catalytic coating which comprises the steps of preparing an aqueous colloidal solution of particles of one or more catalytically active non-noble metal doping oxide(s), contacting said solution with particles of a preformed washcoat base comprising a high surface area crystalline alumina, thereby uniformly adsorbing said doping particles thereon, limiting the amount of said doping oxide particles to amounts less than about 20% by weight of said doped preformed particles, and drying and calcining said doped preformed particles.

2. The method of claim 1 wherein said solution is prepared as a stable substantially neutral colloidal solution.

3. The method of claim 1 wherein said solution is prepared as a freshly made transient colloidal solution, wherein preformed particles are stirred and wherein said solution is added promptly thereto, thereby causing its dopant oxide particles to be adsorbed uniformly by said alumina particles prior to coalescence and precipitation of said dopant oxides.

4. The method of claim 1 wherein at least two doping oxides are used.

5. The method of claim 4 wherein said doping oxides are selected from the group consisting of titania, zirconia, iron oxide, cerium oxide, lanthanum oxide, nickel oxide and chromium oxide.

6. The method of claim 5 wherein said solution comprises at least one of titania and zirconia whereby the surface area loss during sintering of said preformed particles under exposure to high temperatures is slowed substantially.

7. The method of claim 5 wherein said doping oxides in said solution comprise at least one oxide selected from ceria, chromium oxide, iron oxide and nickel oxide additionally having catalytic activity.

8. In a method of producing a catalytic structure comprising a support, a high surface area alumina-containing washcoat preformed thereon and a noble metal catalyst, the improvement of adsorbing onto said washcoat uniform particles of at least one catalytically active non-noble metal doping oxide and at least one alumina-stabilizing non-noble metal doping oxide, both from aqueous colloidal solutions.

9. A method as claimed in claim 8 and in which said doping oxides are provided in amounts less than about 20% by weight of said doped washcoat.

10. The method of claim 1 and in which catalytic noble metal is applied to said doped washcoating.

11. A wash-coated catalytic support comprising a high surface area preformed crystalline alumina-containing washcoat base, a predominant amount of which carries uniformly adsorbed catalytically active colloidal particles of one or more non-noble metal doping oxides in amounts less than about 20% by weight.

12. A washcoated catalytic support as claimed in claim 11 and in which the adsorbed dopant oxide particles are calcined.

13. A washcoated catalytic support as claimed in claim 12 and in which said doping oxide comprises one of the colloidal particles of titania and zirconia.

14. A washcoated catalytic support as claimed in claim 12 and in which at least two doping oxides are adsorbed by said alumina particles.

15. A washcoated catalytic support as claimed in 12 and in which said doping oxides are selected from the group consisting of colloidal particle titania, zirconia, iron oxide, cerium oxide, lanthanum oxide, nickel oxide and chromium oxide adsorbed in amounts less than about 20% of the total weight of doping oxides and preformed particles.

16. A washcoated catalytic support as claimed in claim 12 and in which noble metal is deposited on said adsorbed doping oxide particles.

17. A washcoated catalytic support comprising a high surface area preformed crystalline alumina-containing washcoat base, a predominant amount of which carries, uniformly adsorbed, a catalytically active non-noble colloidal metal doping oxide and an alumina-stabilizing non-noble colloidal metal doping oxide.

* * * * *